United States Patent [19]

Delage

[11] Patent Number: 4,521,181
[45] Date of Patent: Jun. 4, 1985

[54] FUEL FUME GENERATOR KIT

[76] Inventor: Richard A. Delage, 58 Old Pool Rd., Biddeford, Me. 04005

[21] Appl. No.: 603,924

[22] Filed: Apr. 26, 1984

[51] Int. Cl.³ .............................................. F23D 11/44
[52] U.S. Cl. ....................................... 431/207; 222/3; 222/335; 431/11; 431/247
[58] Field of Search ...................... 222/3, 335; 431/11, 431/247, 207, 208; 122/4 R

[56] References Cited

U.S. PATENT DOCUMENTS

| 2,293,356 | 8/1942 | Parker | 222/3 |
| 4,008,038 | 2/1977 | Berthiaume | 431/11 |
| 4,013,396 | 3/1977 | Tenney | 431/11 |
| 4,431,401 | 2/1984 | Kunst et al. | 431/11 |

Primary Examiner—Edward G. Favors
Attorney, Agent, or Firm—William Nitkin

[57] ABSTRACT

A fuel fume generator kit with a fuel tank having a fuel entry chamber and a vacuum chamber separated by a baffle, said baffle having apertures defined at the bottom thereof to allow the fuel to pass from the entry chamber to the vacuum chamber; means to heat the fuel in said tank; means to provide vacuum to the vacuum chamber to cause the fuel therein to create fumes; means to carry the fuel fumes to pressure means to be then pressurized in a line extending to the device in which the vaporized fuel is to be burned having on the pressure line a reserve tank to build up and contain a pressure therein to help maintain a constant pressure at the device where the fuel is to be burned; and a pressure switch controlling the pressure in the pressure line interconnected to the pressure means with a pressure relief valve operated at a set pressure level on the pressure line near the device to be operated.

8 Claims, 1 Drawing Figure

FUEL FUME GENERATOR KIT

BACKGROUND OF THE INVENTION

1. Field of the Invention

The kit of this invention is in the field of the production of gasoline or equivalent fuel fume for the operation of devices which burn fuel and more particularly relates to a gasoline fume generator kit to produce gasoline fume which can be used in gas-operated appliances and other devices operating on fumes from gasoline such as motor vehicles and the like.

2. History of the Prior Art

Natural and bottled gas have long been used to operate water-heaters stoves, heaters for buildings and the like. Further, motor vehicles are often adapted to operate on gas such as propane in a variety of circumstances.

SUMMARY OF THE INVENTION

It is an object of this invention to provide a gasoline or equivalent fuel fume generator kit to provide a highly economical gas fume which can be used by devices currently using natural or bottled gas and which kit is adaptable for use in gas-operated vehicles which can be gas-operated.

It is a further object of this invention to provide such gasoline fume generator kit in a simple, safe and easy-to-utilize structure which can be operated by homeowners and those not possessing technical knowledge of such a specialized system.

The kit of this invention includes a tank for the storage of a volatile fluid fuel such as gasoline or equivalent which can include, but is not limited to, leaded or unleaded gasoline, premium gasoline, white gas, ethynol or any fuel which will create fumes thereof upon the application of vacuum. The tank has two chambers separated by a baffle. The first chamber is the entry chamber with entry means for entering the fuel into the tank. A vent may also be included at the top of the entry chamber which can be part of the entry means. The above-mentioned baffle separates the entry chamber from the second chamber being the vacuum chamber. This baffle has at least one aperture located near its base to allow the fuel to pass therethrough into the vacuum chamber which when being filled, will allow the fuel therein to seek its own level at approximately the same height as the level of the fuel in the entry chamber. Means to preheat the fuel in the tank is also provided. Atop the vacuum chamber is an exit pipe through which vacuum is applied to the area above the fuel in the vacuum chamber. Upon the application of vacuum, the fuel already having fumes above the top of its fluid level forms further fumes and the fuel fumes are carried through the exit pipe into a vacuum pipe line. A compound vacuum pressure gauge can be located on this vacuum pipe line as well as a relief valve which can be piped to a vent should there be any buildup of pressure beyond a preset level in the vacuum line. This relief valve can also be used to vent the vacuum chamber while filling the tank to allow entry of fluid therein by allowing air therein to escape as it is being replaced by the fluid fuel. The vacuum is created in this system by a vacuum compressor pump which is attached with its vacuum side in line with the vacuum line. At the exit port of the vacuum compressor pump the gas fumes, which have been pulled out of the vacuum chamber above the fluid level of the fuel in such chamber, enter a pressure line and are forced through the rest of the system by the pressure side of the vacuum compressor pump. Along the pressure line the fume passes through a check valve which closes after the pump shuts off to prevent back pressure. The pressure line continues to a pressure switch which operates to open and control the pressure line when the vacuum compressor pump is activated. A reserve tank on the pressure line then fills with fuel fumes to a preset limit. This reserve tank helps to maintain the continuity of fuel fume flow to the device or appliance being operated irrespective of any cycling operation of the vacuum compressor pump. A pressure of 0.5 psi is standard on all propane and natural gas appliances. A pressure gauge on the pressure line indicates the pressure at that point within the system beyond the reserve tank. The pressure line continues, and near the device to be operated a shutoff valve is provided thereon and in one embodiment, a fuel preheater through which the pressure line may run can be utilized to further warm the heated fumes which will make them burn even more efficiently. Before the pressure line is attached to the preheater, a pressure regulator valve on such pressure line is adjusted at a predesired level, usually 0.5 psi maximum, to allow the fumes to flow only upon reaching a desired pressure and the fuel line to the device to be operated is then completed as in the normal fashion with natural or bottled gas. The appliance's fuel burning orifice may have to be adjusted for the fuel fumes but it has been found that the use of such gas fumes is approximately seven times more energy-productive than equivalent amounts of natural or bottled gas and could create a savings to the consumer in the 50-75% range of cost of fuel as the fuel utilized in the kit of this invention is far less costly per Btu produced than the cost of other currently available fuel sources.

DESCRIPTION OF THE PREFERRED EMBODIMENT(S)

Figure 1:
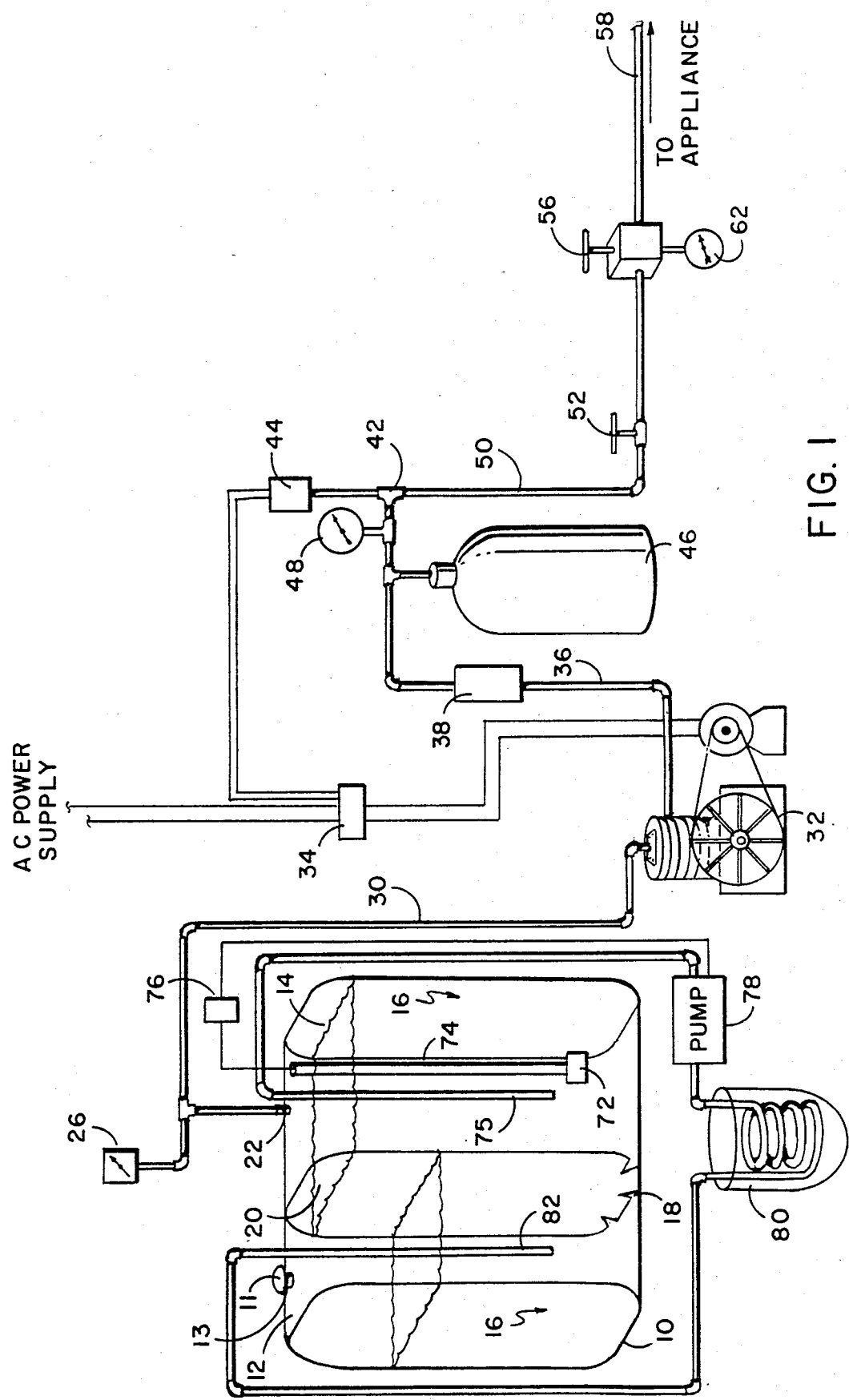
FIG. 1 illustrates the system of the kit of this invention.

FIG. 1 illustrates a view of the kit of this invention constructed to operate an appliance. It should be understood that this structure could be incorporated in other similar devices designed for different purposes, for example, in a motor vehicle designed to operate on gas fumes. The particular embodiment shown in this drawing is suitable for home use for appliances and the like. Seen in FIG. 1 is tank 10 which is divided into two chambers, an entry chamber 12 and a vacuum chamber 14. Dividing the two chambers from one another is baffle 20. At the base of baffle 20 can be a series of baffle apertures 18. In practice, fuel is entered through entry cap 11 in the top of entry chamber 12. Vent 13 can also be provided in the top of the entry chamber which is shown as part of cap 11. The fuel, when entered, tends to seek its own level between entry chamber 12 and vacuum chamber 14 because it passes through the baffle 20 at the bottom through each of baffle apertures 18. It is important to have the baffle apertures located near the bottom of the baffle so that the vacuum in the vacuum chamber is not destroyed by atmospheric leakage from the entry chamber. When vacuum is applied, fuel 16 may seek a different higher level because the vacuum would cause there to be subatmospheric pressure in the area above fuel 16 in the vacuum chamber 14. The higher atmospheric pressure in entry chamber 12 would cause depression of the fluid level in entry chamber 12.

It is desirable to preheat the fuel in the tank to raise the temperature of the fuel fumes in the system as hotter fuel fumes burn more efficiently. To accomplish this preheating, an embodiment of the system can include a fuel preheating means such as intake pipe 75 extending into vacuum chamber 14 below the fuel level which intake pipe extends out of the tank to a pump 78. Pump 78 pumps the fuel through intake pipe 75 out of vacuum chamber 14 and then pumps it through heating means 80 which can be a tankless coil in the furnace or any other equivalent means to heat the fuel. The fuel, after being heated to approximately 100 F. is then pumped through entry pipe 82 back into the entry chamber 14 and the fuel mixes with the fuel in the vacuum chamber. A probe 72 in vacuum chamber 14 senses the temperature of the fuel and is connected to an aquastat 76 such as a T675A or equivalent through pipe 74 which aquastat controls the operation of pump 78 turning it on if the temperature of the fuel is too low and turning it off if the temperature is too high.

The vacuum in vacuum chamber 14 is created by vacuum compressor pump 32 which can be a compressor-type pump such as an oil burner pump or equivalent. It should be noted that any other equivalent type of vacuum compressor pump can be substituted therefor without departing from the spirit and scope of the invention claimed herein. The vacuum compressor pump should be sufficient to create a vacuum in the vacuum chamber above the level of fuel 16 therein and to cause its fuel to fume. The vacuum compressor pump is interconnected to the vacuum chamber through vacuum line 30 which terminates as an exit pipe at the top of the vacuum chamber. This pipe provides the vacuum to the vacuum chamber. A compound gauge 26, indicating vacuum and pressure levels, can be positioned along vacuum line 30. Vacuum compressor pump 32 is operated by a motor driven by a power supply 34 which is indicated as an AC power supply such as found in a home. It should be noted that other power supplies can operate the vacuum compressor pump depending on the place of usage of the device. The fuel fumes pass from vacuum line 30 to and through vacuum compressor pump 32 and exit therefrom under pressure to pressure line 36 which runs to check valve 38 and passes therethrough. Should pressure cease in the pressure line, check valve 38 closes to prevent back pressure. Interposed along pressure line 36 at position 42 thereon after check valve 38 is pressure switch 44 which can be a Honeywell P404A pressure switch or equivalent which determines the amount of pressure in the remainder of the system and allows the fumes under pressure to pass therethrough at a predetermined level, for example, 6-12 psi. Pressure switch 44 controls the amount of pressure entering the remaining portion 50 of the pressure line. A reserve tank 46 which can be a 100 lb. propane tank or any equivalent storage tank can further be interposed before the pressure switch on the pressure line to store a portion of the fuel fumes under pressure to maintain an even flow in the system so that the pilot of the appliance will not go on and off as the vacuum compressor pump 32 starts and stops during its normal operation to provide the proper range of pressure to pressure switch 44 which controls the operation of the motor of the vacuum compressor pump 32. Pressure gauge 48 on the pressure line with a range of approximately 5-10 psi indicates the amount of pressure in the pressure line after the pump which pressure line then extends to a shutoff valve 52 which is near to the appliance or device to be operated so that the system can be shut down when desired. Lastly the pressure line runs through an adjustable pressure regulator 56 which can be set no higher than 0.5 psi before fumes will flow therethrough so that the device being operated will always have sufficient pressure from the line to operate continuously and the fumes, even if not immediately under pressure from the vacuum compressor pump, is always under pressure from the reserve tank in order to maintain the pilot light of the device. Adjustable pressure regulator 56 may include a pressure gauge 62 thereon. The orifice(s) in the appliance may need some adjustment to utilize the fuel fumes produced by this kit and such adjustment can be accomplished simply by changing the diameter of the burner's orifice(s) to accommodate the new fuel operating system. It is important to adjust the appliance to the proper stoichiometric amount of air required that will assure the complete burning of fuel fumes and the continuous flow of the fumes within the system. It is believed that the kit of this invention is extremely safe even though in a preferred embodiment it is creating fumes from gasoline since there is no spark or fire of any kind to affect the fumes that pass through the system and no air containing oxygen within the system until the fuel fumes reach the device where it is to be burned.

Although the present invention has been described with reference to particular embodiments, it will be apparent to those skilled in the art that variations and modifications can be substituted therefor without departing from the principles and spirit of the invention.

I claim:

1. A fuel fume generator kit comprising:
   a tank adapted to contain liquid fuel;
   a baffle disposed in said tank;
   an entry chamber formed in said tank to one side of said baffle;
   a vacuum chamber formed in said tank on the other side of said baffle from said entry chamber;
   means to enter said fuel into said entry chamber;
   means for fuel to pass from said entry chamber to said vacuum chamber while maintaining separate atmospheres in said entry chamber and in said vacuum chamber;
   means to heat the fuel in said tank;
   means to cause fuel in said vacuum chamber to turn to a fumed state; and
   means to cause said fuel fumes to be delivered under pressure to a device to be operated by such fuel.

2. The device of claim 1 wherein said means to enter fuel from said entry chamber to said vacuum chamber comprises at least one aperture defined in said baffle between said entry chamber and said vacuum chamber below the fuel level in said chambers.

3. The device of claim 2 wherein said means to cause said fuel in said vacuum chamber to turn to a fumed state comprises a vacuum compressor pump with the vacuum side thereof connected by a vacuum line to said vacuum chamber above the level of the fuel therein.

4. The device of claim 3 wherein said means to cause said fuel fumes to be delivered under pressure to a device to be operated by such fuel comprises said vacuum compressor pump with the pressure side thereof pumping said fuel fumes through a pressure line to said device to be operated by such fuel.

5. The device of claim 4 further including:

pressure switch means to sense the pressure in the means to deliver said fuel fumes under pressure to said device to be operated by said fuel fumes, said pressure switch means adapted to control the operation of said vacuum compressor pump to cause said pump to operate upon detecting a predetermined low pressure level in said pressure line and to shut off said vacuum compressor pump upon detecting a predetermined high pressure level in said pressure line.

6. The device of claim 5 further including back pressure reduction means between said pressure switch means and said vacuum compressor pump, said back pressure reduction means comprising:
   a check valve on said pressure line adapted to close on a predetermined reduction of pressure in said line when said vacuum compressor pump shuts off in order to prevent back pressure.

7. The device of claim 5 further including a reserve tank on said pressure line before said pressure switch means, said reserve tank adapted to contain a quantity of said fuel fumes under pressure and release them to maintain a continuous steady flow of fuel fumes irrespective of any cycling of said vacuum compressor pump.

8. The device of claim 7 wherein said means to heat the fuel in said tank comprises:
   an intake pipe positioned in said vacuum chamber with its end at a level below the level of the fuel, said intake pipe extending out of said chamber;
   a pump attached to said intake pipe;
   heater means interconnected to said pipe and adapted to receive said fuel therefrom and to heat said fuel;
   an entry pipe interconnected to said heater and extending into said entry chamber adapted to receive said fuel once heated in said heater means and to direct said heated fuel into said entry chamber; and
   temperature sensing means adapted to measure the temperature of the fuel in said tank and to activate said pump if the temperature of said fuel falls below a predetermined point and to shut off said pump if the temperature of said fuel rises above a predetermined point.

* * * * *